(12) United States Patent
Ushinohama et al.

(10) Patent No.: US 12,550,876 B2
(45) Date of Patent: Feb. 17, 2026

(54) FISHING ROD AND ATTACHMENT/DETACHMENT STRUCTURE FOR FISHING LINE GUIDE

(71) Applicant: GLOBERIDE, Inc., Higashikurume (JP)

(72) Inventors: Kosuke Ushinohama, Higashikurume (JP); Yoshinori Nakahata, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/711,433

(22) PCT Filed: Oct. 14, 2022

(86) PCT No.: PCT/JP2022/038298
§ 371 (c)(1),
(2) Date: Jun. 18, 2024

(87) PCT Pub. No.: WO2023/074403
PCT Pub. Date: May 4, 2023

(65) Prior Publication Data
US 2025/0017186 A1     Jan. 16, 2025

(30) Foreign Application Priority Data
Oct. 28, 2021  (JP) ................. 2021-176573

(51) Int. Cl.
*A01K 87/04*  (2006.01)
*A01K 87/02*  (2006.01)

(52) U.S. Cl.
CPC ............ *A01K 87/04* (2013.01); *A01K 87/025* (2013.01)

(58) Field of Classification Search
CPC .... A01K 87/04; A01K 87/008; A01K 87/009; A01K 87/02; A01K 87/00; A01K 87/06
See application file for complete search history.

(56) References Cited

U.S. PATENT DOCUMENTS 2,543,881 A * 3/1951 Umphlette ............. A01K 87/06
24/522
3,614,143 A * 10/1971 Stevens ................... F16B 12/40
29/458

(Continued)

FOREIGN PATENT DOCUMENTS

| AU | 2020204440 A1 * | 1/2021 | ........... A01K 87/007 |
| CN | 101897323 A * | 12/2010 | ............. A01K 87/06 |

(Continued)

OTHER PUBLICATIONS

Dec. 27, 2022 International Search Report issued in International Patent Application No. PCT/JP2022/038298.

(Continued)

*Primary Examiner* — Katelyn T Truong
(74) *Attorney, Agent, or Firm* — Oliff PLC

(57) ABSTRACT

To provide a fishing rod comprising an attachment/detachment structure in which a fishing line guide is attachable and detachable, in which the fishing line guide is prevented from being damaged at the time of attachment and detachment. A fishing rod 1 of the present invention comprises a guide attachment/detachment structure 30 of a fishing line guide 8. The guide attachment/detachment structure comprises a base component 40 fixed to a rod surface and formed with a recess 41 on which a guide leg of the fishing line guide can be placed, and a tubular fixing component 50 slidably disposed with respect to the rod and press-fitted so as to cover the base component 40, and the guide leg 8b of the fishing line guide is placed in the recess 41 of the base component 40 and fixed to the rod by sliding the fixing component 50 and press-fitting the fixing component into the base component 40.

8 Claims, 17 Drawing Sheets

(56) References Cited

U.S. PATENT DOCUMENTS

| | | | | |
|---|---|---|---|---|
| 4,050,179 A | * | 9/1977 | Johnson | A01K 87/08 43/22 |
| 5,090,150 A | | 2/1992 | Pirazzini | |
| 5,181,336 A | | 1/1993 | Yasui | |
| 5,347,742 A | * | 9/1994 | Ohmura | A01K 87/06 43/22 |
| 6,381,898 B1 | * | 5/2002 | Lee | A01K 87/06 43/22 |
| 2015/0272099 A1 | * | 10/2015 | Oikawa | B32B 5/12 156/187 |
| 2021/0282383 A1 | | 9/2021 | Omura | |

FOREIGN PATENT DOCUMENTS

| | | | | | |
|---|---|---|---|---|---|
| CN | 108835057 | A | | 11/2018 | |
| CN | 113303294 | A | * | 8/2021 | A01K 87/00 |
| FR | 1183906 | A | * | 7/1959 | |
| FR | 2665333 | A1 | | 2/1992 | |
| GB | 190914137 | A | * | 4/1910 | |
| GB | 196216 | A | * | 4/1923 | |
| JP | H03-065130 | A | | 3/1991 | |
| JP | H04-082961 | U | | 7/1992 | |
| JP | H0767504 | A | * | 3/1995 | |
| JP | 2006-271277 | A | | 10/2006 | |
| JP | 2012-029607 | A | | 2/2012 | |
| JP | 2013-202004 | A | | 10/2013 | |
| JP | 2021-141887 | A | | 9/2021 | |
| KR | 20000020744 | U | * | 12/2000 | |

OTHER PUBLICATIONS

Apr. 30, 2024 International Preliminary Report on Patentability issued in International Patent Application No. PCT/JP2022/038298.
Dec. 12, 2024 Office Action issued in Japanese Patent Application No. 2021-176573.
Oct. 7, 2025 Extended European Search Report issued in European Application No. 22886732.1.
Oct. 30, 2025 Office Action issued in Chinese Application No. 202280082244.1.

* cited by examiner

FISHING ROD AND ATTACHMENT/DETACHMENT STRUCTURE FOR FISHING LINE GUIDE

TECHNICAL FIELD

The present invention relates to a fishing rod in which a fishing line guide is attachable and detachable, and an attachment/detachment structure of the fishing line guide.

BACKGROUND ART

In the related art, a fishing rod to which various fishing reels such as a spinning reel and a double bearing reel can be mounted has been known, and fishing line guides that guide a fishing line paid out from the fishing reel are attached to such a fishing rod at predetermined intervals in a longitudinal direction of the fishing rod. Usually, the fishing line guide includes a guide ring through which the fishing line is inserted and a guide leg fixed to the surface of the rod, and the guide leg is fixed to the surface of the rod by thread fixing or the like.

The fishing line guide is generally fixed so as not to be attachable to and detachable from the rod, but may be configured to be attachable and detachable depending on the fishing rod. For example, Patent Literature 1 discloses a guide attachment/detachment structure in which a tubular insertion member provided with an opening portion for inserting a guide leg at one end is integrally attached to a rod, and a fixing member such as an adhesive which is easily dissolved fills the opening portion in a state where the guide leg is inserted into the opening portion.

CITATION LIST

Patent Literature

Patent Literature 1: JP 3-65130 A

SUMMARY OF INVENTION

Technical Problem

In the guide attachment/detachment structure disclosed in Patent Literature 1 described above, when the fishing line guide is attached, the guide leg is pinched and inserted into the opening portion of the tubular insertion member, so that the guide leg may be bent or damaged due to excessive force applied to the guide leg. In particular, in order to reduce the weight and size of the fishing line guide made of a fiber-reinforced resin, damage such as bending and folding is likely to occur when the fixing member (adhesive) is attached by inserting the guide leg into the opening portion or when the fishing line guide is detached (during the attaching and detaching operation).

The present invention has been made in view of the above problems, and an object of the present invention is to provide a fishing rod comprising an attachment/detachment structure in which a fishing line guide is attachable and detachable, in which the fishing line guide is prevented from being damaged at the time of attachment and detachment, and an attachment/detachment structure of the fishing line guide.

Solution to Problem

In order to achieve the above object, the present invention provides a fishing rod comprising a guide attachment/detachment structure that allows a guide leg of a fishing line guide through which a fishing line is inserted to be attached to and detached from a rod surface, in which the guide attachment/detachment structure comprises a base component fixed to the rod surface and formed with a recess on which the guide leg of the fishing line guide can be placed, and a tubular fixing component slidably arranged with respect to the rod and press-fitted so as to cover the base component, and the guide leg of the fishing line guide is placed in the recess of the base component and fixed to the rod by sliding and press-fitting the fixing component into the base component.

According to the fishing rod having the above-described configuration, the guide leg of the fishing line guide is placed in the recess of the base component fixed to the rod surface, and in this state, the tubular fixing component is slid and press-fitted so as to cover the base component, whereby the guide leg can be fixed. That is, when the fishing line guide is fixed, unlike the related art, a load is not applied to the guide leg such as gripping the guide leg and press-fitting the guide leg into the opening portion, and thus, it is possible to prevent the guide leg from being damaged or damaged such as bending or folding at the time of attaching and detaching the fishing line guide.

In addition, the present invention provides a guide attachment/detachment structure used when a fishing line guide for guiding a fishing line is fixed to a rod of a fishing rod. This guide attachment/detachment structure comprises a base component fixable to the rod surface and formed with a recess on which the guide leg of the fishing line guide can be placed, and a tubular fixing component slidable with respect to the rod and press-fitted so as to cover the base component, and the base component and the fixing component are held in a fixed state with respect to the rod by press-fitting the fixing component into the base component in a state where the guide leg of the fishing line guide is placed in the recess of the base component.

Advantageous Effects of Invention

According to the present invention, in a fishing rod comprising an attachment/detachment structure in which a fishing line guide is attachable and detachable, it is possible to obtain a fishing rod in which the fishing line guide is not damaged at the time of attachment and detachment, and an attachment/detachment structure of the fishing line guide in which the fishing line guide is not damaged at the time of attachment and detachment.

BRIEF DESCRIPTION OF DRAWINGS

FIG. 1 is a view illustrating an embodiment of a fishing rod according to the present invention, in which

FIG. 4 is a view illustrating the guide attachment/detachment structure, in which

FIG. 5 is a view illustrating a base component of the guide attachment/detachment structure, in which

FIG. 6 is a view illustrating a fixing component of the guide attachment/detachment structure, in which

DESCRIPTION OF EMBODIMENTS

Figure 1A:
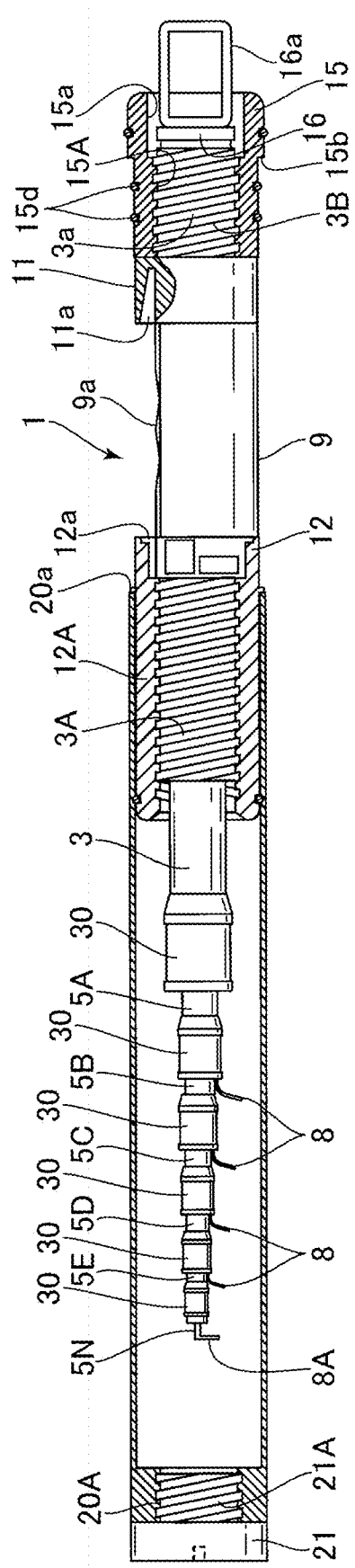
FIG. 1A is a partial cross-sectional view illustrating a storage state of a plurality of rods.
Figure 1B:
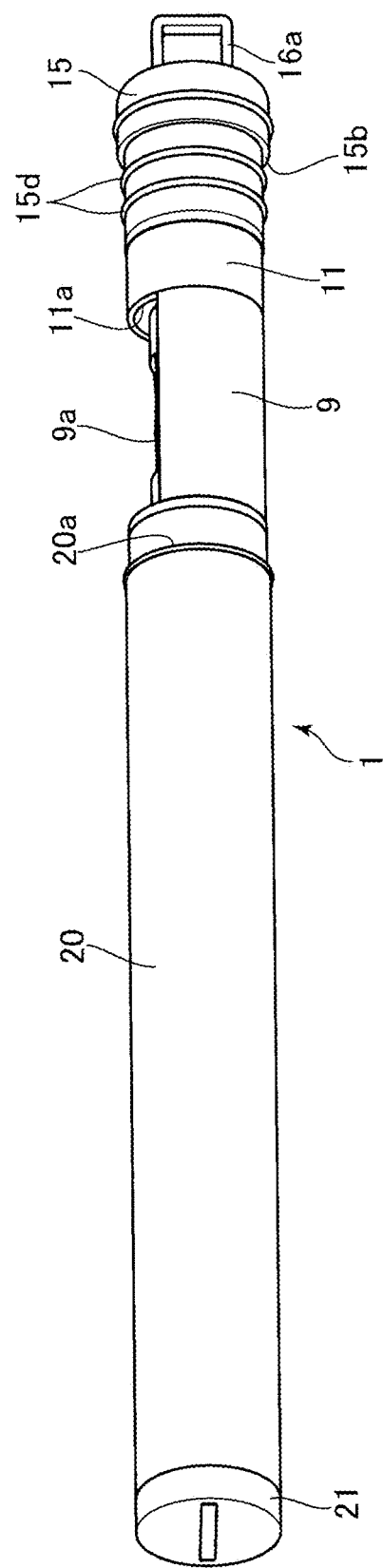
FIG. 1B is a perspective view of the storage state.
Figure 2:
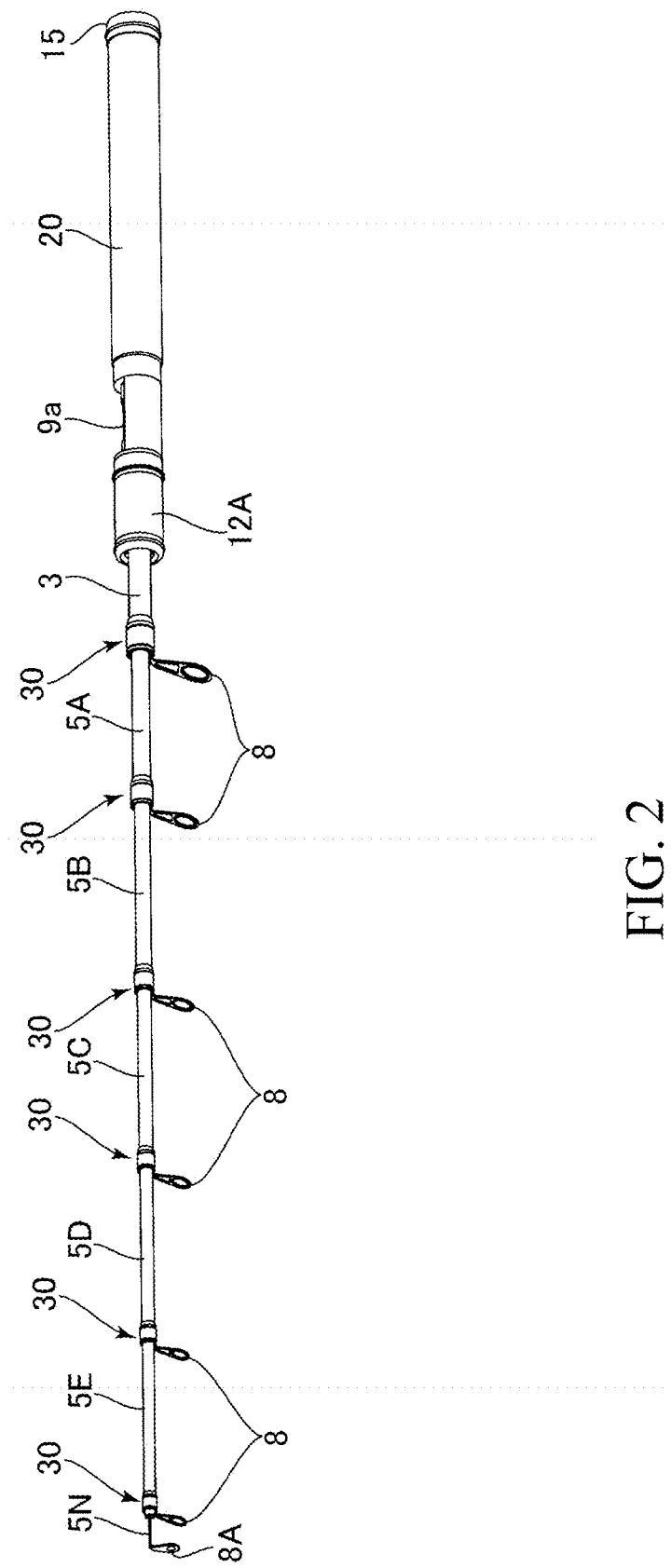
FIG. 2 is a perspective view illustrating a state (use state) in which some of the plurality of rods of the fishing rod illustrated in FIG. 1 are drawn out.
Figure 3:
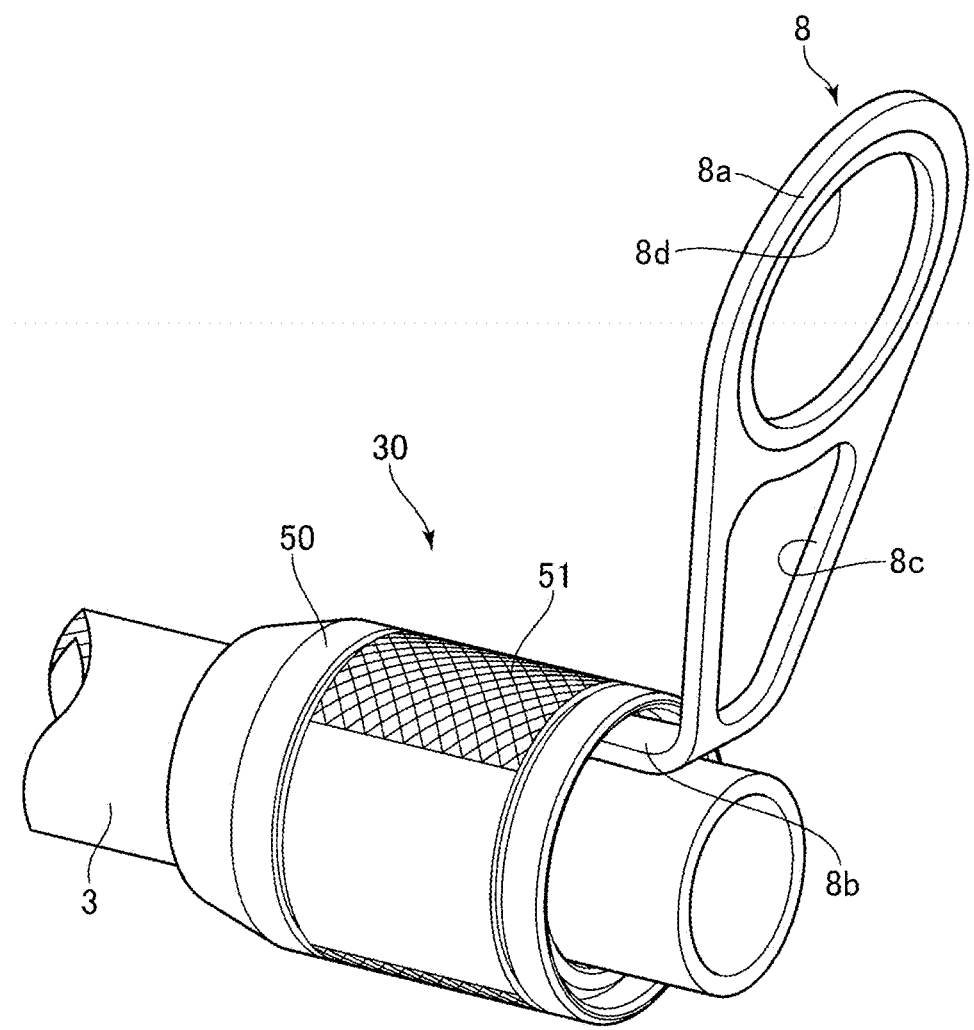
FIG. 3 is a perspective view illustrating a portion of a guide attachment/detachment structure.

FIGS. 1 and 2 are views illustrating an embodiment of a fishing rod according to the present invention, in which FIG. 1A is a partial cross-sectional view illustrating a storage state of a plurality of rods, FIG. 1B is a perspective view of the storage state, and FIG. 2 is a perspective view illustrating a use state in which some of the plurality of rods of the fishing rod illustrated in FIG. 1 are drawn out.

The fishing rod illustrated in FIGS. 1 and 2 exemplifies a so-called mobile rod capable of being shortened in dimension when stored at the time of transportation. Recently, a mobile rod has attracted attention because it is difficult to carry a long rod, the long rod cannot be transported due to restrictions of a transportation company, or transportation cost has increased. In the present embodiment, an attachment/detachment structure of a fishing line guide is arranged on such a mobile rod.

A fishing rod (mobile rod) 1 illustrated in the drawings is configured as a swing type in which a plurality of rods 5A, 5B, 5C, 5D, 5E, 5N are accommodated in an original rod 3, and are sequentially drawn out and joined. The number of rods (the number of joining rods) stored inside the original rod 3 is arbitrary, N (rod 5A to rod 5N) rods are sequentially stored in large-diameter rods, and the rod 5N having the smallest diameter is a tip rod (FIG. 1A and FIG. 2 do not illustrate all the rods to be stored).

Fishing line guides 8 for guiding a fishing line are attached to distal ends of the original rod 3 and the plurality of rods (fishing line guide 8A is a top guide). In FIG. 1, the distal end of the original rod 3 is illustrated in a state where the fishing line guide is detached from the guide attachment/detachment structure to be described later, and in FIG. 2, the distal end of the original rod 3 is illustrated in a state where the fishing line guide is attached to the guide attachment/detachment structure.

A reel sheet 9 having a reel leg placement portion 9a is disposed on a proximal end side of the original rod 3. A fixed hood 11 is provided on the rear end side of the reel sheet 9, and a moving hood 12 that moves in an axial direction is provided on the front end side of the reel sheet.

The fixed hood 11 is fixed to the outer peripheral surface of the proximal end portion of the original rod 3, and comprises a receiving hole 11a opened toward the reel leg placement portion 9a. The moving hood 12 also comprises a portion 12a that opens toward the reel leg placement portion 9a. The moving hood 12 comprises an operating part 12A in which a female screw portion screwed to a male screw portion 3A provided on the original rod 3 is formed, and a reel leg is mounted on the reel leg placement portion 9a, the rear side is fitted into the receiving hole 11a of the fixed hood 11, and the operating part 12A is rotated, whereby the reel leg is fastened and fixed by the moving hood 12 and the fixed hood 11. Although the male screw portion 3A screwed with the operating part 12A is formed on the outer peripheral surface of the original rod 3, a tubular reel sheet may be externally fitted to the outer peripheral surface of the original rod 3 and formed on the outer peripheral surface of the reel sheet.

The original rod 3 is attached such that a rear end side of the fixed hood 11 protrudes in the axial direction, a male screw portion 3B is formed in the protrusion portion 3a, and a lower plug (buttock) 15 is screwed. The lower plug 15 is formed in a cap shape, and is formed in a cylindrical shape whose rear end portion is opened (opening portion 15a). Further, a middle lower plug 16 is fixed to the rear end opening of the original rod 3 by a screwing structure or a press-fitting structure, and closes the rear end opening of the original rod 3.

A ring-shaped attachment portion 16a closed in a rectangular shape is integrally formed with the middle lower plug 16 toward the rear side, and the attachment portion 16a is configured to protrude toward the rear side in a state where the lower plug (buttock) 15 is screwed and fixed to the rear end of the original rod 3.

A tubular cover member 20 having a function of preventing protrusion of a plurality of rods stored in the original rod is mounted to be attachable to and detachable from the original rod 3 along the axial direction. The cover member 20 is configured to be press-fitted and fixed to the operating part 12A rotatably arranged on the original rod 3, and also has a function as a so-called grip which is grasped and held at the time of actual fishing by being detached from the original rod 3 (operating part 12A) along the axial direction and attached to the rear end portion of the original rod 3 as illustrated in FIG. 2. That is, the fishing rod 1 of the present embodiment protects the fishing line guide attached to the distal end portion of each rod by covering the front side of the original rod 3 with the cover member 20 (see FIG. 1). In addition, in actual use, by detaching the cover member and attaching the cover member 20 to the rear end of the original rod 3 (see FIG. 2), it is possible to form a long swing-type fishing rod in use while shortening the dimension when stored.

A female screw portion 20A is formed at a distal end portion of the cover member 20, and a lid body 21 is screwed to the female screw portion. In actual use, the cover member 20 is taken out from the original rod 3 (operating part 12A) in the axial direction, and the lid body 21 is detached from the distal end of the cover member 20. In addition, the lower plug 15 is detached from the original rod, and in this state, the female screw portion 20A of the cover member 20 is screwed to the male screw portion 3B of the original rod 3.

As a result, the cover member 20 serves as a grip extending rearward from the fixed hood 11, and can be used with a long axial length.

Although the rear end of the cover member 20 in the grip state opens, the opening can be closed by press-fitting the detached lower plug 15 into this portion and abutting a rear end edge (opening end) 20a of the cover member 20 on an annular step portion 15b of the lower plug. The detached lid body 21 can be integrated with the lower plug 15 by screwing the male screw portion into the female screw portion of the lower plug 15, and closes the opening portion 15a of the lower plug 15.

The fishing rod 1 of the present embodiment has a configuration in which both types of reels, that is, a spinning reel and a both bearing reel can be mounted, the spinning reel is mounted in a state in which the reel sheet 9 and the fishing line guide 8 face downward, and the both bearing reels are mounted in a state in which the reel sheet 9 and the fishing line guide 8 face upward.

An attachment/detachment structure (hereinafter, the guide attachment/detachment structure) 30 of the fishing line guide is provided at the distal end of each rod, and the fishing line guide 8 is attachable to and detachable from each rod by the guide attachment/detachment structure 30.

Here, a configuration of the guide attachment/detachment structure 30 of the present embodiment will be described with reference to FIGS. 3 to 7. The above-described fishing line guide 8 is configured to comprise a guide ring 8a through which a fishing line is inserted and a guide leg 8b attached to the surface of the original rod (rod) 3, and the guide leg 8b is formed to extend in the axial direction of the rod to be attached. In this case, the guide leg 8b and the guide ring 8a are connected by a connecting portion 8c, and the guide leg 8b, the guide ring 8a, and the connecting portion 8c are integrally formed of, for example, lightweight metal such as aluminum, a fiber-reinforced resin material, or the like. A ring member 8d made of ceramics or the like is press-fitted into the portion of the guide ring 8a as necessary so as to reduce the sliding resistance of the fishing line.

The guide attachment/detachment structure 30 comprises a base component 40 which is fixed to a rod surface (in the drawings, the rod is the original rod 3) and in which a recess 41 in which the guide leg 8b of the fishing line guide 8 can be placed is formed, and a tubular fixing component 50 which is slidably arranged with respect to the rod 3 and press-fitted so as to cover the base component 40.

The base component 40 is integrally formed of metal, resin, wood, hard rubber, or the like, and is fixed to the rod surface by adhesion or the like. In this case, the base component only needs to be in a fixed state with respect to the rod, and various fixing means such as screwing, winding a fixing thread and solidifying the fixing thread with resin, winding a tape member, and the like can be used. Alternatively, the base component may be configured to be fixed to the rod surface in an attachable and detachable manner. In this way, by making the base component attachable and detachable, it is also possible to replace the base component with an appropriate base component according to the shape of the guide leg 8b of the fishing line guide 8.

In addition, the recess 41 formed in the base component 40 may be processed in accordance with the shape of the guide leg 8b of the fishing line guide attached to the recess, and may have a shape in which the guide leg 8b is placed in the recess so as not to cause rattling or the like. Then, the fixing component 50 is slid in a state where the guide leg 8b is placed in the recess 41, and the fixing component 50 is attached to the base component 40 (attached so as to be slid and press-fitted in the axial direction), whereby the fishing line guide 8 can be fixed to the original rod 3.

As illustrated in FIG. 4, the recess 41 is preferably formed such that the guide leg 8b is in direct contact with the rod surface. With such a configuration, hit of fish can be easily transmitted to the rod through the fishing line guide, fish signal sensitivity can be improved, and the guide leg can be directly brought into contact with the rod surface to suppress the guide height. Of course, the recess 41 may have a bottom portion, and the bottom portion may be interposed between the back surface of the guide leg to be placed and the rod surface. In addition, it is preferable to form a chamfer (taper) 41a for the upper end edge for forming the recess 41, and this makes it easy to install (place) the guide leg 8b in the recess 41 from above.

The fixing component 50 is formed of metal, resin, wood, hard rubber, or the like in a tubular shape (cylindrical shape with both axial sides open). In addition, it is also possible to form a resin containing carbon fibers by a 3D printer, and when such a material containing carbon fibers is formed by a 3D printer, unlike conventional injection molding and die molding, an irregularity shape in which a large number of carbon fibers protrude is developed on the surface, so that the frictional force with the guide leg 8b to be inserted is improved, and the fishing line guide 8 can be made difficult to come off during actual fishing. Such a fixing component 50 is formed to have a diameter larger than an outer diameter of the original rod 3, and is disposed to be slidable in the axial direction along the original rod 3. In addition, by forming an uneven portion (knurled or the like) 51 on the surface thereof, the sliding operation and the rotation operation can be easily performed.

As described above, the guide leg 8b is placed in the recess 41 of the base component 40, and in this state, the fixing component 50 is slid in the axial direction and press-fitted into the base component 40, so that both are integrated (the fishing line guide 8 is fixed by the fixing component 50). In this case, the guide leg 8b is fixed by press-fitting the fixing component 50 into the base component 40 in the axial direction (the male screw portion 45 formed on the outer peripheral surface on the rear end side of the base component 40 and the female screw portion 55 formed on the inner peripheral surface on the rear end side of the fixing component 50 are not screwed). However, after the guide leg 8b is placed and the fixing component 50 is press-fitted into the base component 40, both may be fixed by screwing. That is, by forming the male screw portion 45 on the rear end side of the base component 40 and forming the female screw portion 55 on the rear end side of the fixing component 50, the fixing component 50 is press-fitted into the base component 40, and then the fixing component is rotated, so that both can be fixed.

Figure 4A:
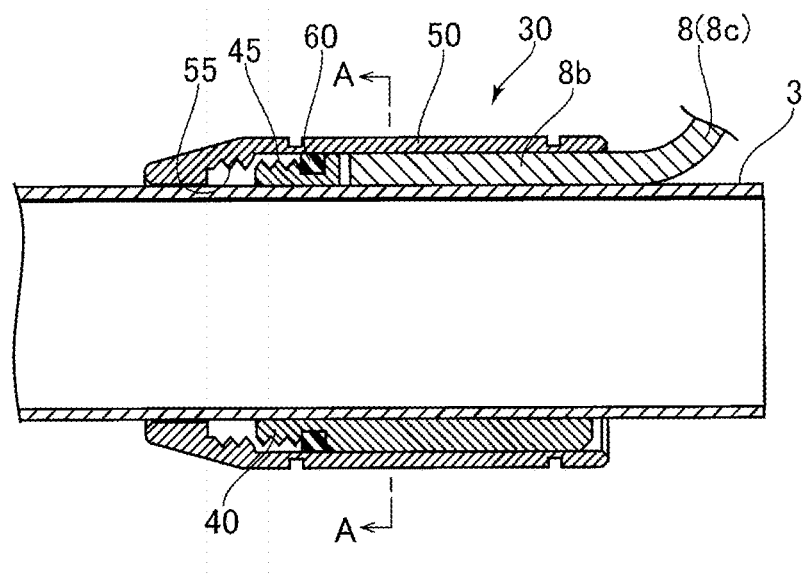
FIG. 4A is a cross-sectional view taken along an axial direction.

As described above, the screwing portions of both may be configured such that the fixing component 50 is press-fitted into the base component 40 to fix this state when the fishing line guide 8 is fixed, or may be configured such that the fixing component 50 is integrated with the base component 40 when the fishing line guide 8 is not mounted. When both are configured to be fixed by screwing in this manner, the components do not move when the rod is stored or carried, and thus, it is difficult for the components to be scratched. When the guide leg 8b is placed in the recess 41 of the base component and fixed by the fixing component 50, the rear end of the guide leg 8b and the base component 40 may be slightly separated from each other or may be in contact with each other as illustrated in FIG. 4A.

In addition, it is preferable that a circumferential groove 46 to which an O-ring 60 in close contact with the inner surface of the fixing component 50 is fitted is formed on the surface of the base component 40. When the fixing component 50 is press-fitted in such a circumferential groove 46 with the O-ring 60 fitted therein, the frictional force between both is increased, so that the fixing component 50 is less likely to come off from the base component 40 (anti-loosening), and looseness caused by a dimensional error or the like can be absorbed. In addition, in the configuration in which the screwing portion is provided as described above, it is possible to prevent the screws from adhering to each other at the time of delivery.

The recess 41 of the base component 40 and the guide leg 8b of the fishing line guide 8 placed thereon are preferably configured as follows.

Figure 4B:
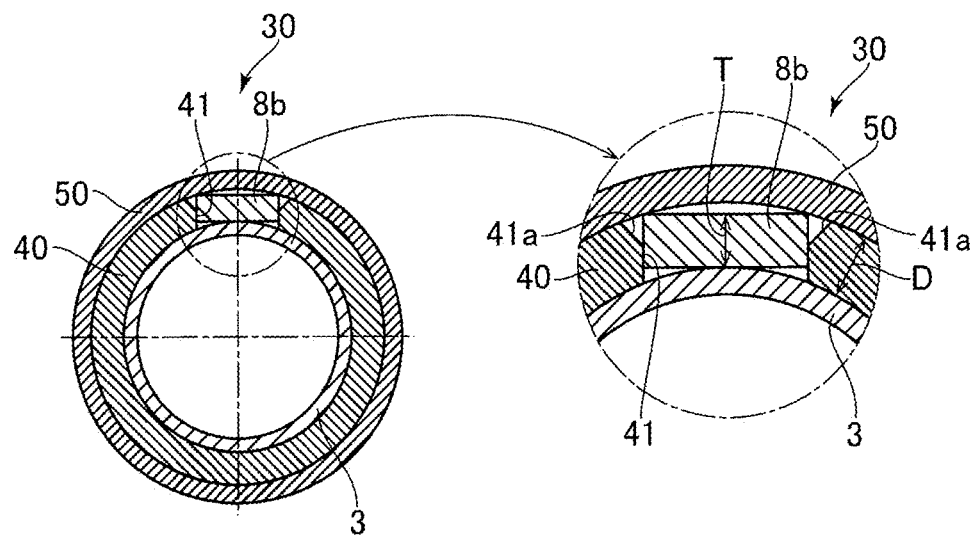
FIG. 4B is a cross-sectional view taken along line A-A in FIG. 4A.

As illustrated in FIG. 4B, when the thickness of the guide leg 8b is T and the depth of the recess 41 of the base component 40 is D, T≥D is preferably set. As described above, by forming the thickness of the guide leg 8b to be equal to or larger than the depth of the recess 41, when the fixing component 50 is press-fitted, the guide leg 8b can be pressed by the inner surface of the fixing component, and the fishing line guide 8 can be made hardly detached. When the base component 40 is made of a hard material, the shape of the recess 41 is preferably slightly larger than the shape of the guide leg 8b so that the placement operation is easy. However, when the base component 40 is made of a flexible material, the shape of the recess 41 is preferably slightly smaller than the shape of the guide leg 8b so that the fixing component is slightly press-fitted.

In addition, as illustrated in FIG. 4B, when the cross-sectional shape of the guide leg 8b is a rectangular shape, gaps are generated between the surface of the original rod 3 and the guide leg 8b and between the inner surface of the fixing component 50 and the guide leg 8b. However, it is preferable to form the cross-sectional shape of the guide leg 8b in a substantially arc shape in accordance with the curvature of the original rod 3 so as not to generate such gaps.

Figure 4C:
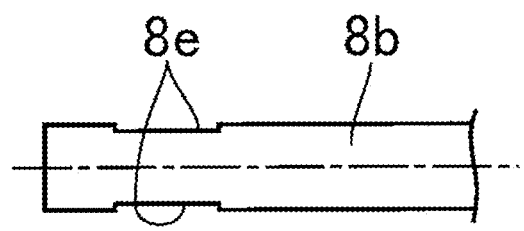
FIG. 4C is a plan view of a guide leg portion.
Figure 4D:
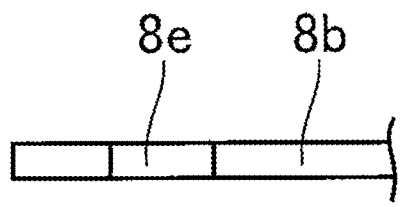
FIG. 4D is a side view of the guide leg portion.
Figure 5A:
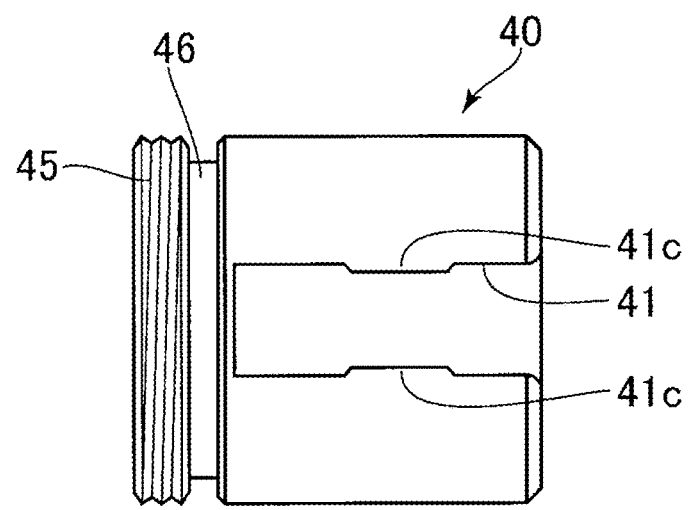
FIG. 5A is a plan view.
Figure 5B:
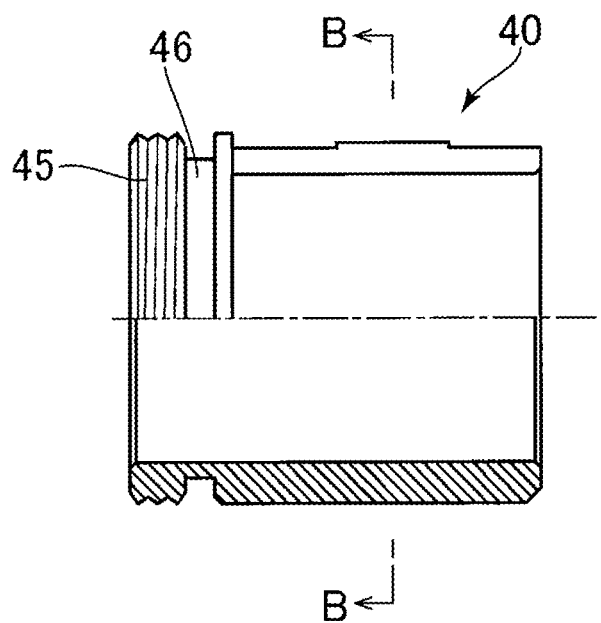
FIG. 5B is a cross-sectional view taken along the axial direction.
Figure 5C:
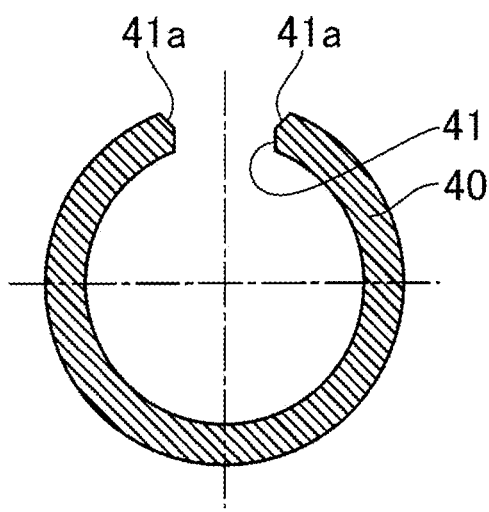
FIG. 5C is a cross-sectional view taken along line B-B of FIG. 5B.
Figure 6A:
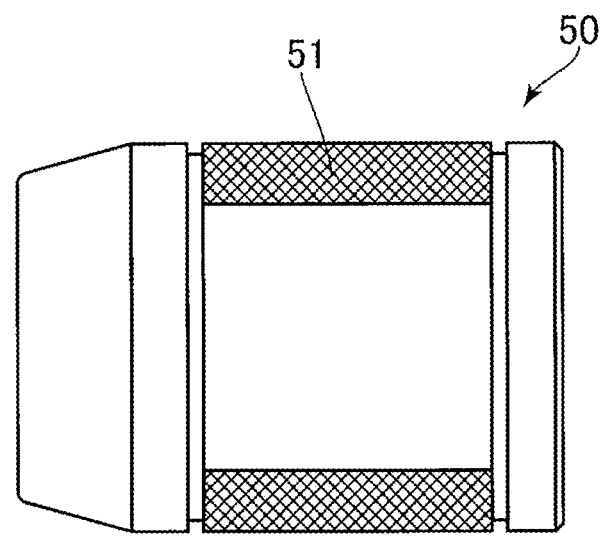
FIG. 6A is a plan view.
Figure 6B:
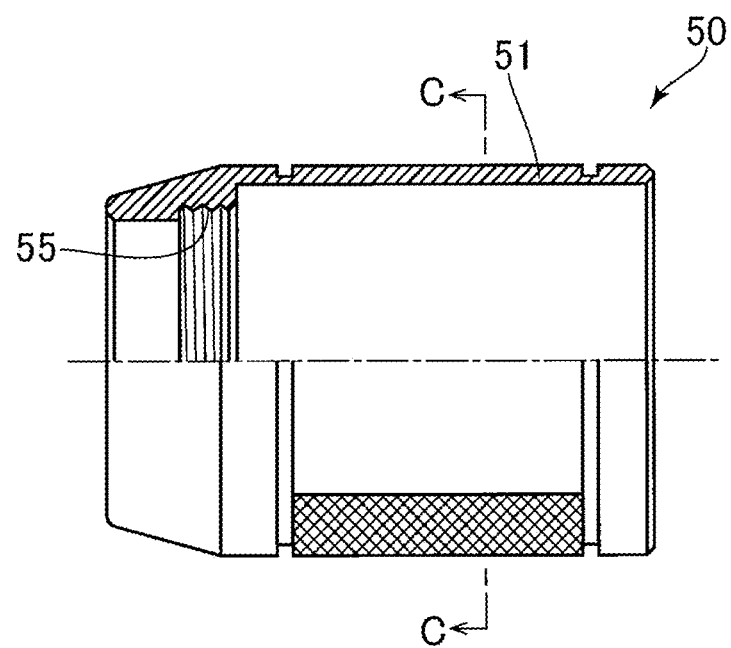
FIG. 6B is a cross-sectional view taken along the axial direction.
Figure 6C:
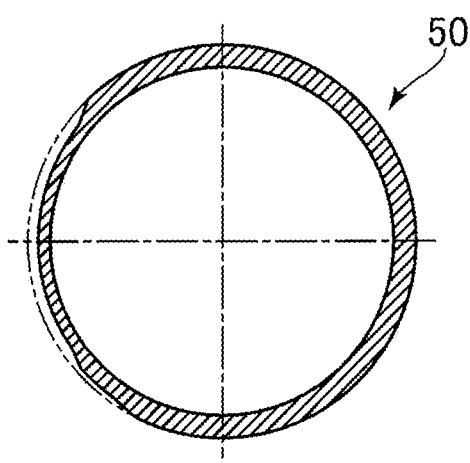
FIG. 6C is a cross-sectional view taken along line C-C of FIG. 6B.
Figure 7:
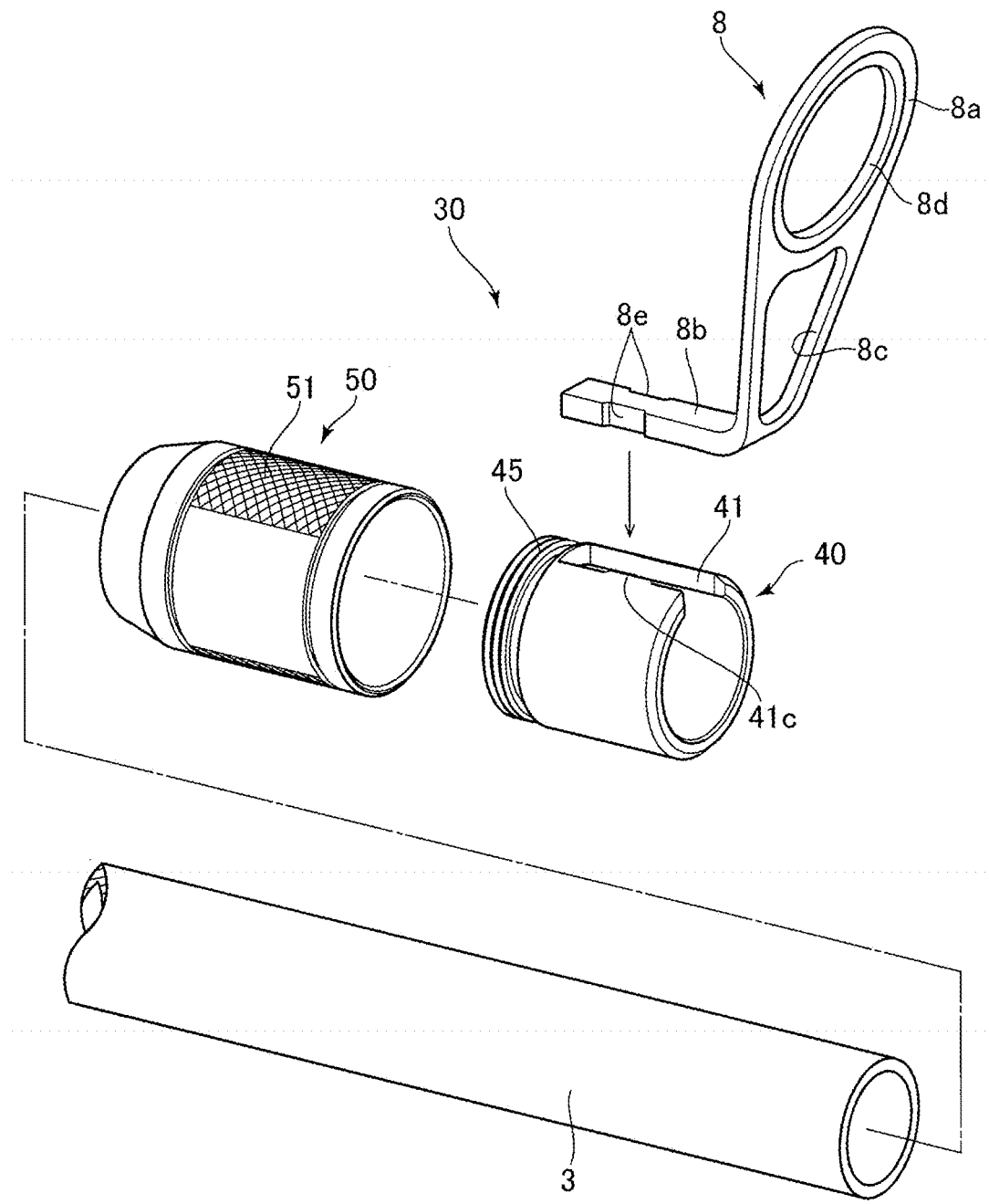
FIG. 7 is an exploded perspective view of the guide attachment/detachment structure.

In the recess 41 and/or the guide leg 8b of the base component 40, it is preferable to form a retaining portion that prevents the guide leg 8b from coming off in the axial direction when the guide leg 8b is placed in the recess 41 and the fixing component 50 is press-fitted. As illustrated in FIGS. 4C and 4D, the retaining portion of the present embodiment is configured by forming cutout depressions 8e on both sides of the guide leg 8b in the width direction, and forming protrusions 41c fitted to the depressions 8e on both inner walls of the recess 41 in the width direction as illustrated in FIG. 5A.

By forming such a retaining portion, the fishing line guide 8 is less likely to come off in the axial direction, and the fishing line guide 8 can be prevented from falling off during actual fishing.

Figure 8A:
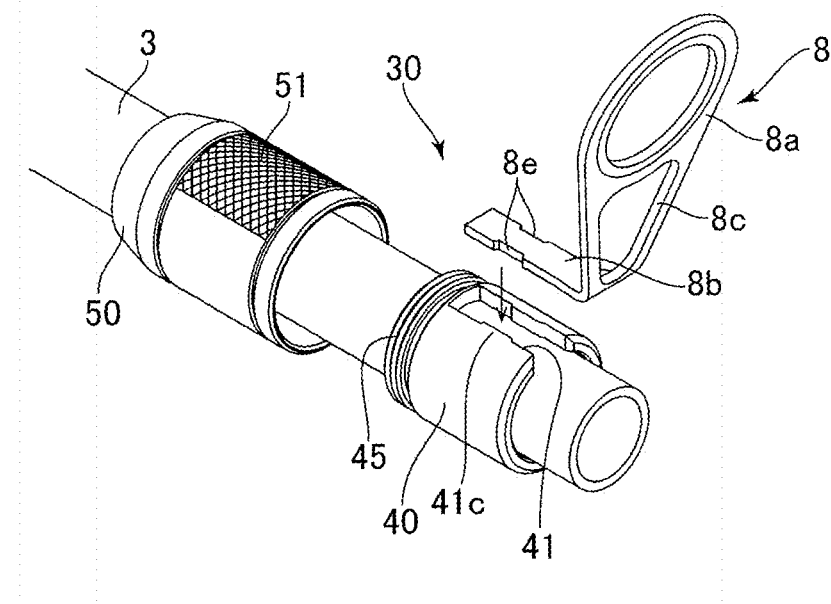
FIGS. 8A to 8C are views sequentially illustrating a process of attaching the fishing line guide to the rod using the guide attachment/detachment structure.
Figure 8B:
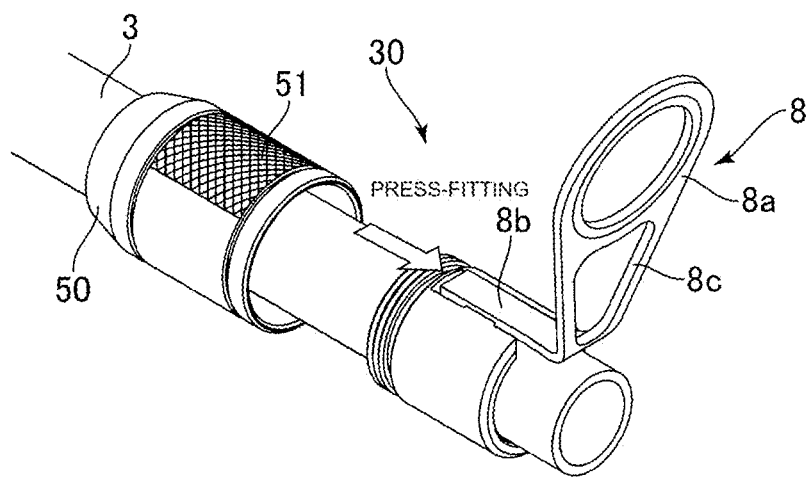
Figure 8C:
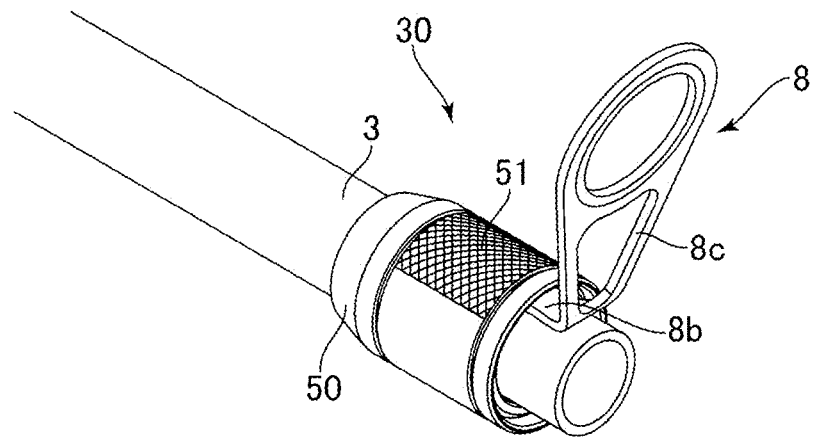

Next, a usage mode of the guide attachment/detachment structure 30 will be described with reference to FIGS. 8 and 9. As illustrated in FIG. 8A, the guide leg 8b of the fishing line guide 8 is placed in the recess 41 of the base component 40 fixed to the original rod 3. In this case, since the shape of the recess 41 and the shape of the guide leg 8b substantially match, the fishing line guide 8 does not fall off or the like. In this state, as illustrated in FIGS. 8B and 8C, the fixing member 50 is slid and press-fitted into the base component 40, whereby the fixing operation of the fishing line guide is completed.

As described above, when the fishing line guide 8 is fixed, the guide leg 8b is merely placed in the recess 41, and unlike the conventional art, the guide leg 8b and the connecting portion 8c are not pinched and the press-fitting operation or the like is not performed. Therefore, a load is not applied to the guide leg 8b and the connecting portion 8c, and it is possible to prevent the guide leg from being damaged, and damage such as bending and folding from occurring at the time of the attaching and detaching operation of the fishing line guide. In addition, by preparing a plurality of types of the fishing line guides 8 having different heights, for example, even when the spinning reel is replaced with the bait reel, the fishing line guide can be easily changed to a fishing line guide having an appropriate height and size, and can be handled by one fishing rod.

Figure 9A:
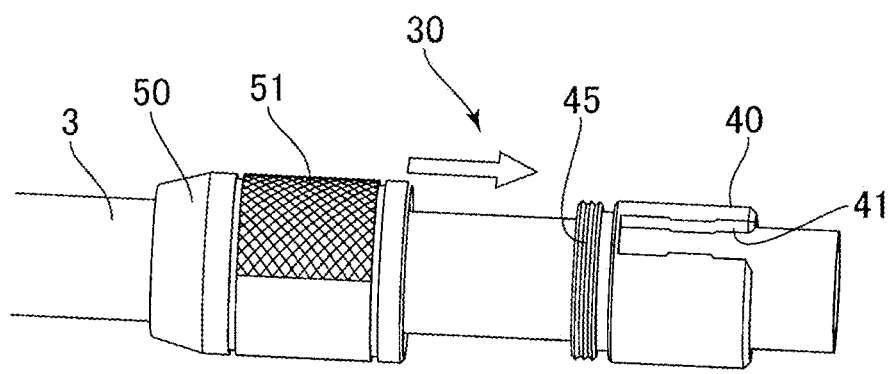
FIGS. 9A to 9C are views illustrating a process of sequentially fixing the fixing component to the base component.
Figure 9B:
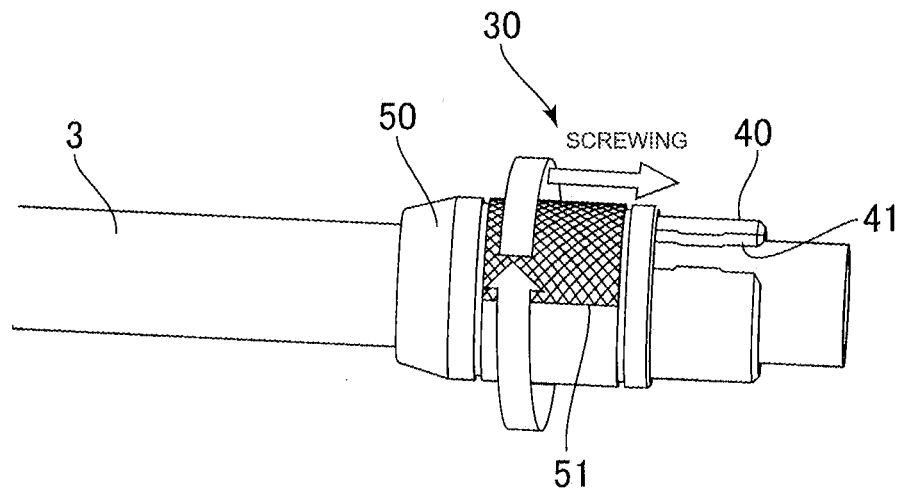
Figure 9C:
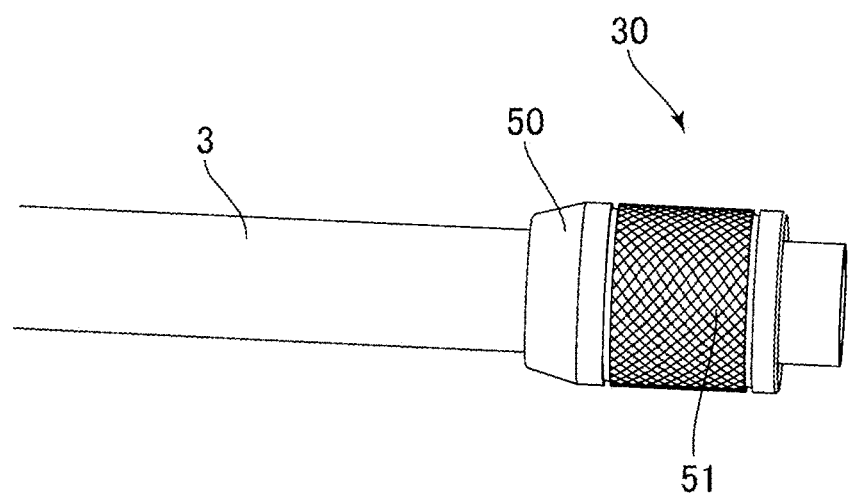

In addition, when the fishing line guide 8 is not used, as illustrated in FIGS. 9A to 9C, the fixing member 50 is slid to the base component 40, and the fixing component 50 is tightened by the screwing portion formed on both, whereby the fixing component 50 is fixed to the base component, so that it is possible to make it difficult to damage the base component 40 at the time of actual fishing, carrying, or the like.

Figure 10A:
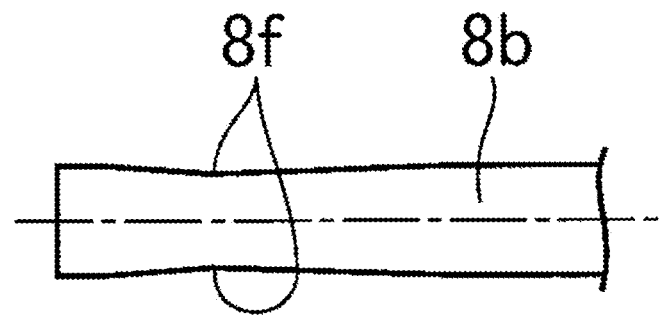
FIGS. 10A to 10E are plan views illustrating various modifications of a retaining portion formed on the guide leg of the fishing line guide.
Figure 10B:
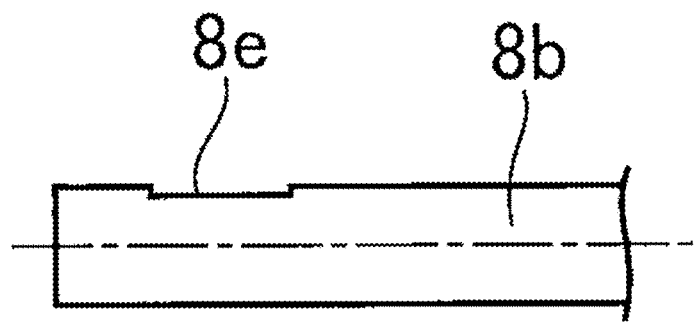
Figure 10C:
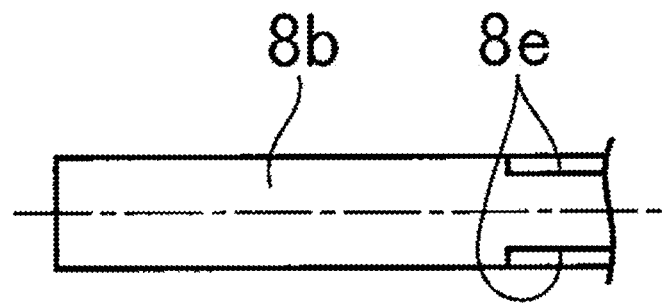
Figure 10D:
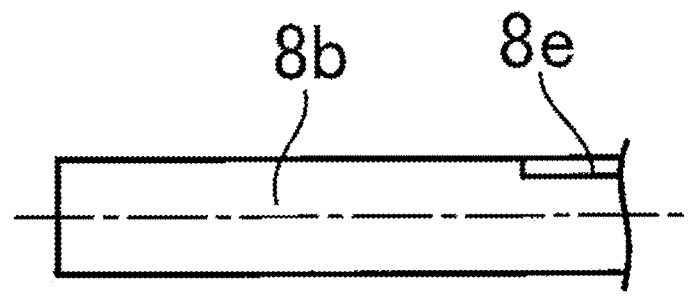
Figure 10E:
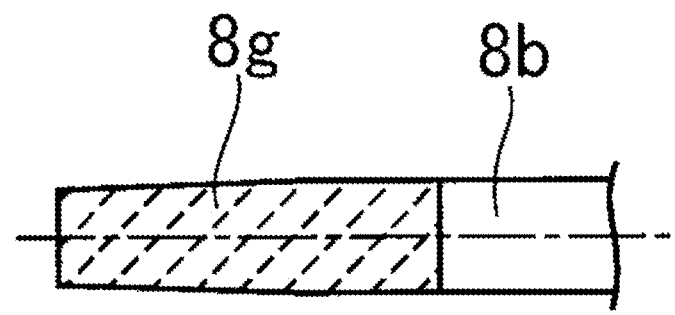

The present invention is not limited to the embodiment described above, and can be modified in various forms. FIGS. 10A to 10E are plan views (directions in which the right side of the drawing comes out) illustrating modifications of the guide leg 8b. As described above, the retaining portion of the fishing line guide is configured by forming the depression 8e in the guide leg 8b, but the configuration of such a retaining portion can be variously modified. For example, as illustrated in FIG. 10A, a taper 8f may be formed so as to widen toward the distal end side. In addition, as illustrated in FIG. 10B, the depression 8e may be formed on one of both side surfaces. In addition, as illustrated in FIGS. 10C and 10D, the position where the depressions 8e is formed and the number of the depressions can be appropriately deformed. In addition, as illustrated in FIG. 10E, a high friction portion 8g may be formed by roughening the surface of the guide leg 8b, applying a friction member, or the like.

Figure 11A:
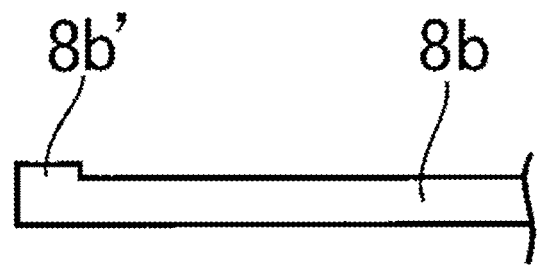
FIGS. 11A and 11B are side views illustrating various modifications of the retaining portion formed on the guide leg of the fishing line guide.
Figure 11B:
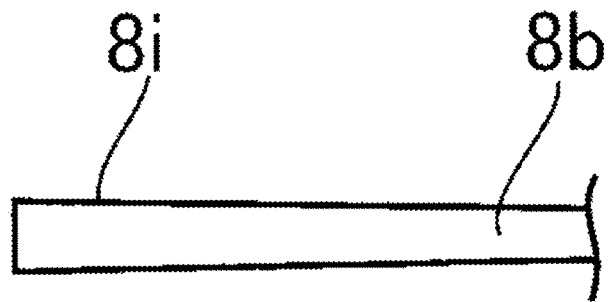

FIGS. 11A and 11B are side views illustrating a modification of the guide leg 8b (a direction in which the right side of the drawing comes out). For example, as illustrated in FIG. 11A, a thick portion 8b' may be formed on the distal end side, or as illustrated in FIG. 11B, a taper 8i may be formed on the upper surface so as to gradually increase in thickness toward the distal end.

As described above, since the guide leg 8b is merely placed in the recess 41 of the base component 40, it is possible to make it difficult for the guide leg to come off when the fixing member 50 is attached by appropriately deforming the shape thereof. In addition, the shape of the recess 41 of the base component 40 can also be appropriately deformed according to the shape of the guide leg 8b.

Figure 12:
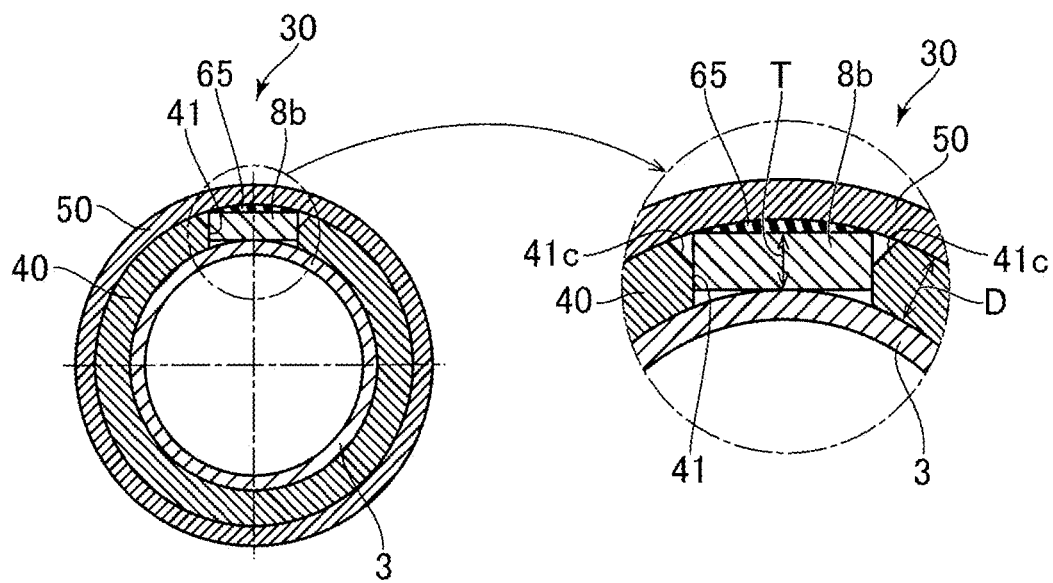
FIG. 12 is a cross-sectional view illustrating a modification of the fixing component of the guide attachment/detachment structure.

FIG. 12 is a view illustrating a modification of the fixing component 50. In this modification, when the thickness of the guide leg 8b is T and the depth of the recess 41 of the base component 40 is D, T<D is set. In such a configuration, since the guide leg 8b is easily detached, an elastic member 65 is attached to the inner surface of the fixing component 50 so as to abut on the surface of the guide leg 8b placed in the recess 41. Even with such a configuration, it is possible to prevent the fishing line guide 8 from coming off and to prevent the rattling or loosening the fishing line guide.

Figure 13:
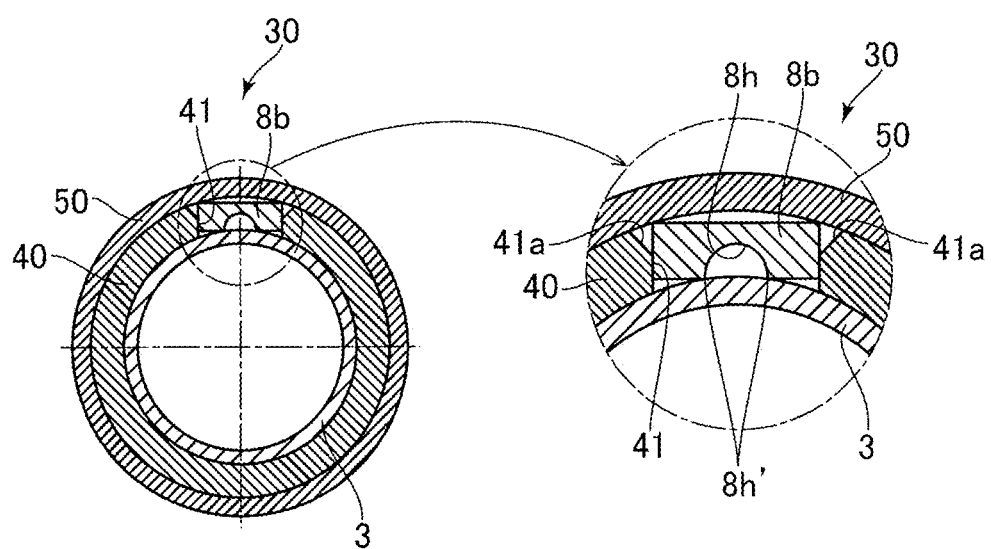
FIG. 13 is a cross-sectional view illustrating a modification of the guide leg placed on the guide attachment/detachment structure.

FIG. 13 is a cross-sectional view illustrating a modification of the guide leg placed on the guide attachment/ detachment structure. When the back surface of the guide leg 8*b* is formed in a flat surface as in the above-described embodiment, the front surface of the original rod 3 and the back surface of the guide leg abut on each other at one point, and the guide may not be stable when the guide is fixed. Therefore, as illustrated in FIG. 13, by forming a recessed portion 8*h* on the back surface of the guide leg 8*b*, the front surface of the original rod 3 and the back surface of the guide leg abut on each other at two points (the abutment portion is indicated by 8*h'*), and it is possible to easily stabilize the fishing line guide when the fishing line guide is fixed. The shape and formation position of the recessed portion are arbitrary, and it is possible to appropriately deform the recessed portion as long as the recessed portion is in contact with the surface of the rod at a plurality of points.

The embodiment of the present invention has been described above; however, the present invention is not limited to the embodiment described above, and can be modified in various forms. In the embodiment described above, the retaining of the fishing line guide 8 can be appropriately deformed, for example, by press-fitting a flexible member. A plurality of guide legs of the fishing line guide 8 may be formed. Furthermore, the guide attachment/detachment structure 30 described above may be provided at a plurality of places in one rod, and can be applied to various fishing rods other than the mobile rod.

REFERENCE SIGNS LIST

1 Fishing rod
3 Original rod (rod)
8 Fishing line guide
8*a* Guide ring
8*b* Guide leg
30 Guide attachment/detachment structure
40 Base component
41 Recess
50 Fixing component

The invention claimed is:

1. A fishing rod comprising
a guide attachment/detachment structure that allows a guide leg of a fishing line guide through which a fishing line is inserted to be attached to and detached from a rod surface, wherein
the guide attachment/detachment structure comprises
a base component fixed to the rod surface and formed with a recess on which the guide leg of the fishing line guide can be placed, and
a tubular fixing component slidably arranged with respect to the rod and press-fitted so as to cover the base component,
the guide leg of the fishing line guide is placed in the recess of the base component and fixed to the rod by sliding and press-fitting the fixing component onto the base component,
a retaining portion is formed on the base component and on the guide leg,
the retaining portion prevents the guide leg from coming off from the recess of the base component in an axial direction when the guide leg is placed in the recess and the fixing component is press-fitted,
protrusions are on inner walls of the recess of the base component,
depressions are on side faces of the guide leg, and
the retaining portion is configured such that the guide leg is placed in the recess of the base component and the protrusions are fitted into the depressions, thereby preventing the guide leg from coming off the base component.

2. The fishing rod according to claim 1, wherein the base component is fixed to the rod surface in an attachable and detachable manner.

3. The fishing rod according to claim 1, wherein the fixing component and the base component can be fixed by screwing.

4. The fishing rod according to claim 1, wherein when a thickness of the guide leg is T and a depth of the recess of the base component is D, T≥D is set.

5. The fishing rod according to claim 1, wherein an elastic member abutting on a surface of the guide leg placed in the recess is attached to an inner surface of the fixing component.

6. The fishing rod according to claim 1, wherein a circumferential groove into which an O-ring in close contact with an inner surface of the fixing component is fitted is formed on a surface of the base component.

7. The fishing rod according to claim 1, wherein the recess of the base component is formed to bring the guide leg to be placed into direct contact with the rod surface.

8. A guide attachment/detachment structure that allows a guide leg of a fishing line guide through which a fishing line is inserted to be attached to and detached from a rod surface of a fishing rod, the guide attachment/detachment structure comprising
a base component fixable to the rod surface and formed with a recess on which the guide leg of the fishing line guide can be placed, and
a tubular fixing component slidable with respect to the rod and press-fitted so as to cover the base component, wherein
the base component and the fixing component are held in a fixed state with respect to the rod by press-fitting the fixing component onto the base component in a state where the guide leg of the fishing line guide is placed in the recess of the base component,
a retaining portion is formed on the base component and on the guide leg, and
the retaining portion prevents the guide leg from coming off from the recess of the base component in an axial direction when the guide leg is placed in the recess and the fixing component is press-fitted,
protrusions are on inner walls of the recess of the base component,
depressions are on side faces of the guide leg, and
the retaining portion is configured such that the guide leg is placed in the recess of the base component and the protrusions are fitted into the depressions, thereby preventing the guide leg from coming off the base component.

* * * * *